Patented Jan. 11, 1927.

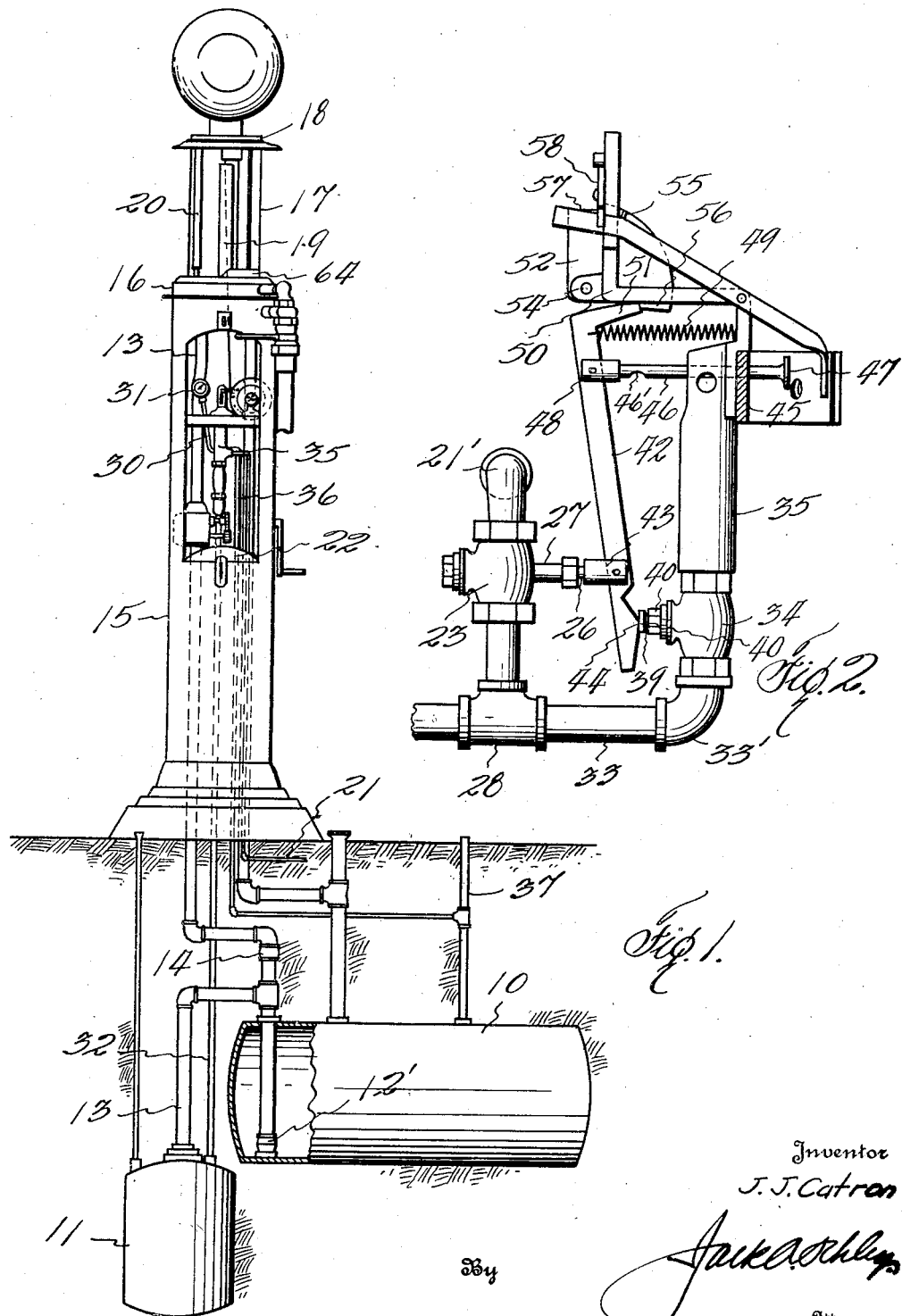

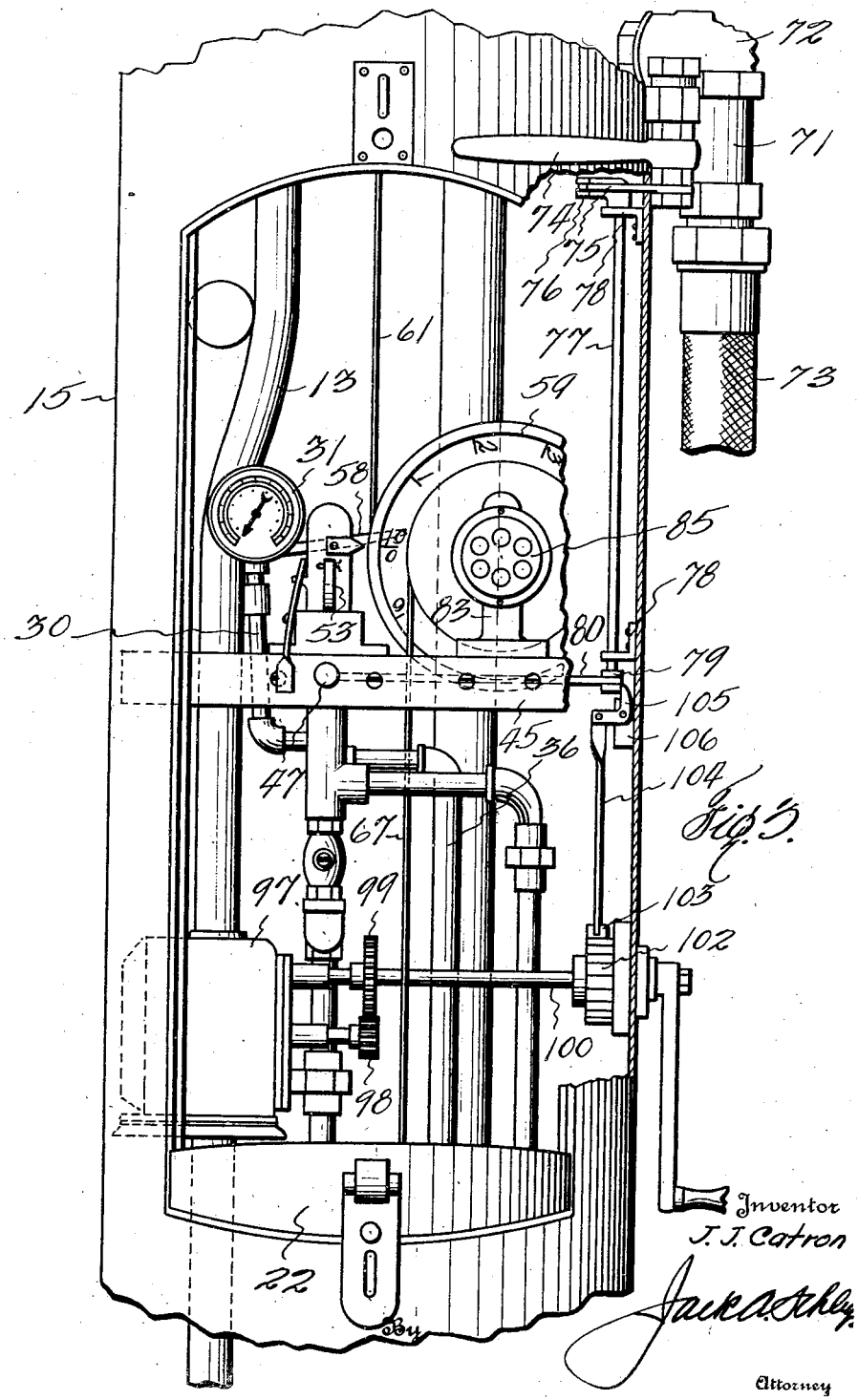

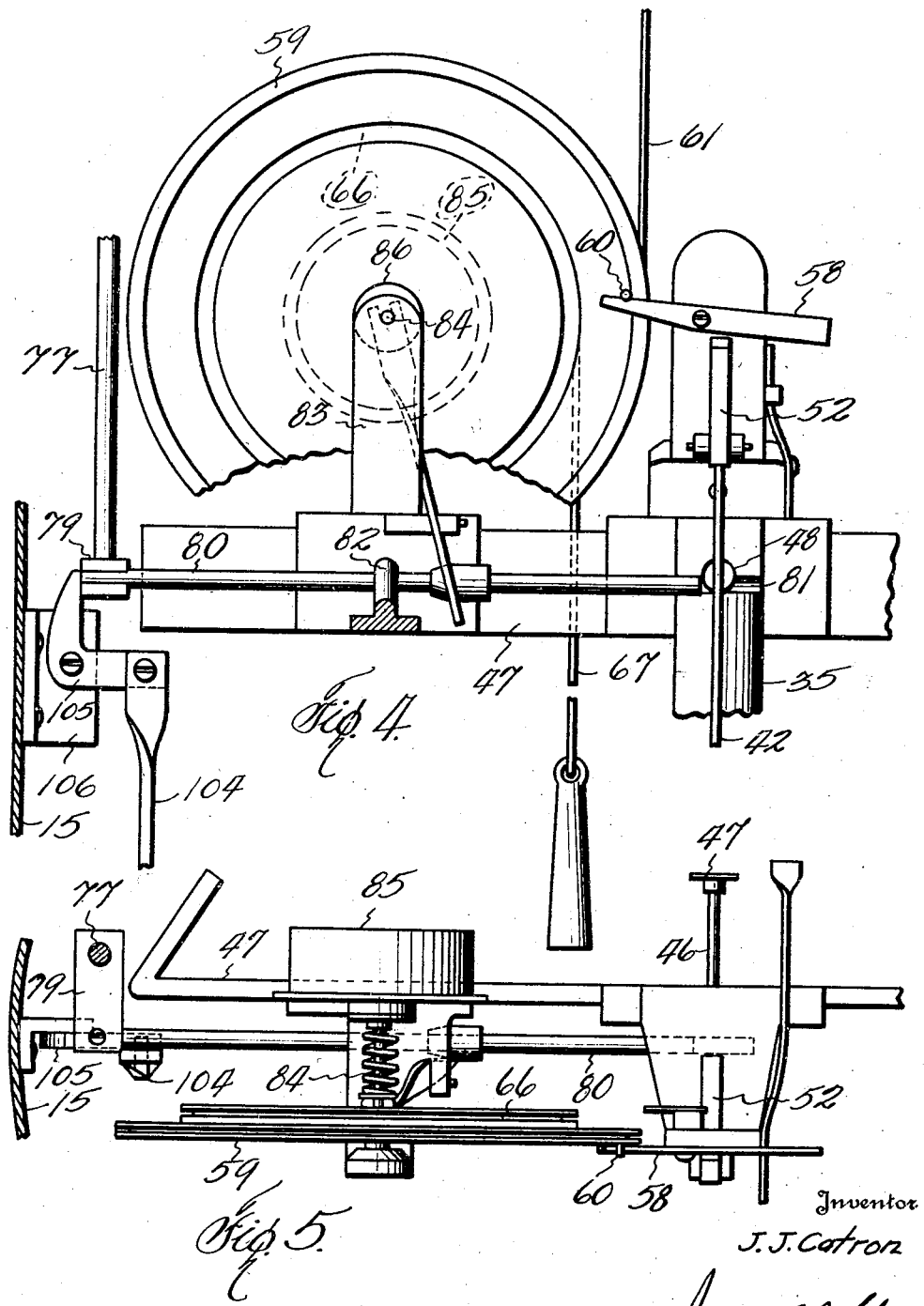

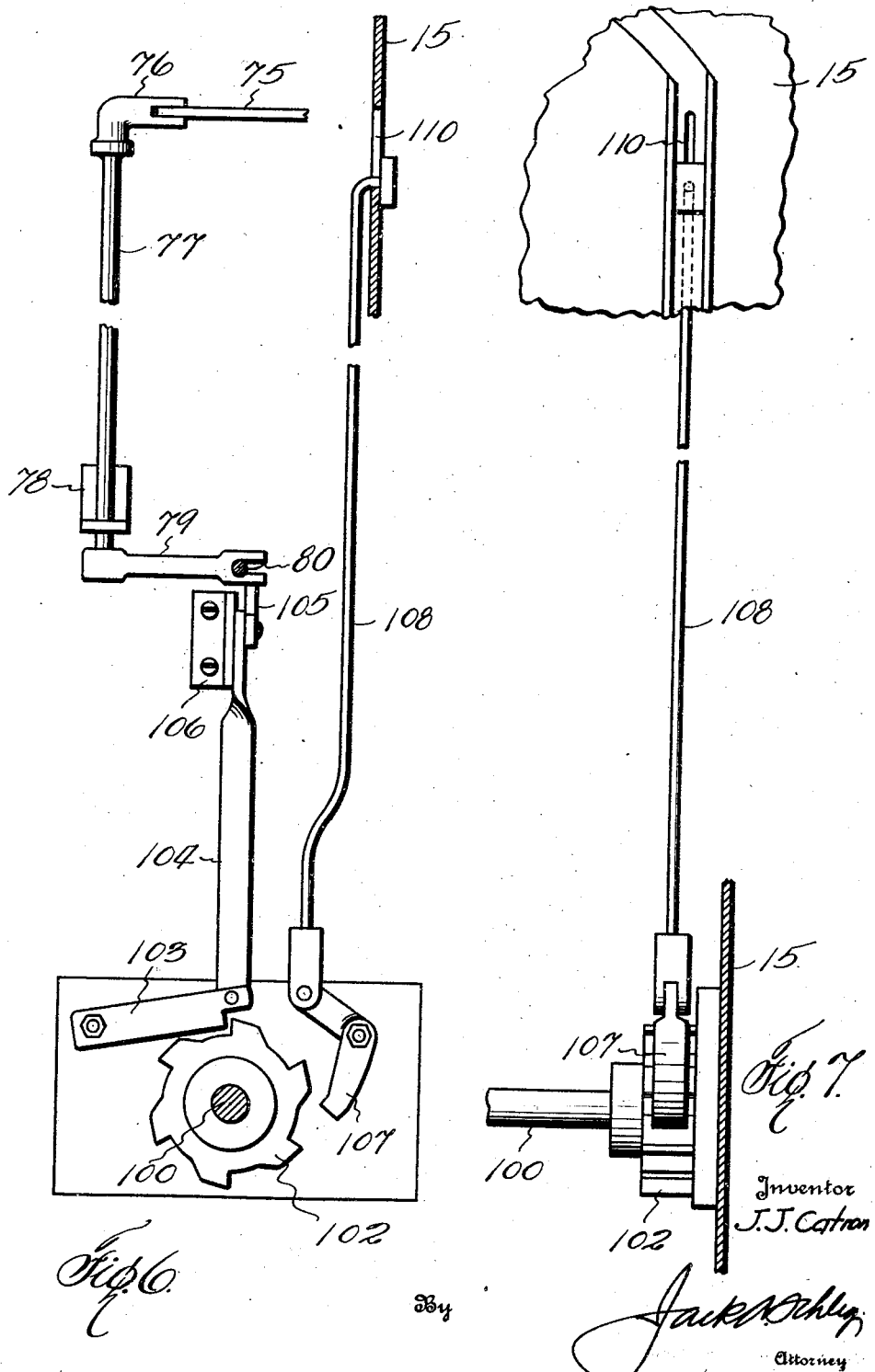

1,613,936

UNITED STATES PATENT OFFICE.

JOHN J. CATRON, OF BONHAM, TEXAS, ASSIGNOR TO CATRON MANUFACTURING COMPANY, OF BONHAM, TEXAS.

LIQUID MEASURING AND DISPENSING MEANS.

Original application filed September 29, 1923, Serial No. 665,582. Divided and this application filed July 26, 1924. Serial No. 728,329.

This invention relates to new and useful improvements in liquid measuring and dispensing means.

This application is a division of my copending application filed September 29th, 1923, Serial No. 665,582.

The object of the invention is to provide means for locking the liquid supply means against operation when liquid is being dispensed from the measuring receptacle.

A further object is to provide a hand operated liquid dispensing valve having connection for operating the liquid supply locking means, so as to lock said supply means when the dispensing valve is open and to release said supply means when the valve is closed.

Another object is to provide a hand pump operating means correlated with the dispensing valve in such a manner as to prevent operation of the hand pump when the dispensing valve is open.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of a liquid dispenser constructed in accordance with my invention, Fig. 2 is a side elevation of the liquid supply control means in its open position, Fig. 3 is an enlarged view of the upper portion of the cabinet and the operating parts therein, Fig. 4 is a rear elevation of the control means and the locking device therefor, Fig. 5 is a plan view of the same, Fig. 6 is a side elevation of the hand pump locking means, and Fig. 7 is a front elevation of the same.

In the drawings the numeral 10 designates an underground storage tank and 11 a pressure tank. A liquid supply pipe 13 leads from the tank 10 and is connected by a branch pipe 13' with the pressure tank, the latter being below the tank 10 and siphoning the liquid therefrom. The supply pipe has a check valve 12' at its lower end in the tank 10 and another check valve 14 just above the connection with the branch pipe 13, in which other check valves may be included. The supply pipe 13 extends up through a cabinet 15 to the base 16 of a visible measuring receptacle which includes a glass cylinder 17 and a cap 18. An overflow pipe 19 leads from a point in the receptacle down through the cabinet to the tank 10.

Compressed air is supplied from a suitable source by means of a pipe 21 which extends up through the cabinet 15. The pipe 21 is turned laterally in the upper portion of the cabinet. At this portion the cabinet has a sliding door 22, operating in channels 22', which when opened gives access to the mechanism within (Figures 3 and 7). The lateral extension of the pipe 21 is connected by an elbow 21' with an air supply valve 23. The supply control is included in my co-pending application filed September 1, 1923, Serial No. 660,480. The valve 23 is of the spring seating type and has a stem 26 extending through a guide nipple 27 on the valve casing. The spring holds the valve normally seated.

The valve 23 is connected with a horizontal T 28 from which a pipe 30 extends upwardly and has an air pressure gauge 31 at its upper end (Figs. 1 and 3). An air supply pipe 32, forming a continuation of the pipe 21 leads down through the cabinet and extends into the tank 11. This pipe supplies compressed air to elevate the liquid through the pipes 13 to the cylinder 17.

It is obvious that whenever the valve 23 is closed, after being operated, there will remain suspended in the pipe 13, the liquid which has not been discharged into the cylinder 17 and also there will be a pressure of air in the tank 11. In order to relieve this pressure, the trapped air is released. For this purpose a short pipe 33 extends forwardly from the T 28 and is connected by an elbow 33' with an air release valve 34. A casting 35 having an elbow at its lower end is connected with the valve. A release pipe 36 suitably directed, leads from the casting down through the cabinet to an upright vent pipe 37 extending from the storage tank 10.

The air release valve includes a free seating valve head and a stem 39 extending through a cap 40 and carrying a button 41 on its outer end. The valves 23 and 34 are disposed with their stems 26 and 39 directed toward each other and the stem 36 a short distance above the stem 39. When the air supply valve 23 is closed the air unseats the valve 34 and escapes from the pipe 32.

Means is provided for operating the valves in common, so that the operator is required to use only one hand for the purpose. In carrying out this feature means is provided for operating the valves in tandem and includes an upright lever 42 pivoted above its lower end in a head 43 mounted on the outer end of the stem 26. The lower edge of the lever has a fulcrum boss 44 shaped with an apex to ride on the button 41.

The casting 35 is secured to a transverse supporting bar 45 which has its ends bent and fastened in the cabinet. The elbow of the pipe 36 is included in this cabinet merely as a matter of convenience. A plunger 46 is slidably mounted in the bar and casting, and has a button 47 on its forward end in front of the bar. On its rear end the plunger has a head 48 in which the upper portion of the lever 42 is pivoted. A coiled spring 49 has one end attached to the lever above the head 48 and its other end connected with a bracket 50 mounted on the casting. When the plunger is pressed inwardly by means of the button 47, the spring 49 is placed under tension, so that when the plunger is released the spring returns the lever.

When the plunger 46 is depressed, the coiled spring 49 is placed under tension, but the valve 23 is not at first opened. This causes the lever 42 to swing in the head 43 and the boss 44 to engage the button 41 and seat the valve 34 before the stem 26 is depressed. By this arrangement the release valve is closed during the initial movement of the lever and prior to the opening of the air valve, 23. A continued movement of the plunger causes the boss 44 to fulcrum upon the button 41, whereby the lever changes its fulcrum point and depresses the stem 26, which unseats the valve 23, thus permitting air to pass to the pipe 32.

In order that the operator need not hold the plunger depressed while the measuring receptacle is filling, a finger 51 is mounted on the upper end of the lever. This finger is directed forwardly and rides under a quadrant latch 52 swinging in a slot 53 in the bracket and pivoted between ears 54 on the rear end of the bracket. Figures 1 and 2. The upward and rearward swinging movement of the quadrant is limited by a pin 55. The quadrant has a lug 56 on its bottom and this rests upon the finger. When the lever is swung rearwardly to open the air supply valve 23 the finger rides under the lug and finally passes the same, which latter drops in front of the finger and locks the lever in the "open" position, as is shown in Fig. 2.

On the rear end of the quadrant a shoulder 57 is cut to receive a latch bar 58 pivoted on the rear side of the bracket. When the lug drops in front of the finger 51 the latch bar drops behind the shoulder 57. The upper surface of the finger is rounded and the rear edge of the lug is bevelled. When the lever 42 is swung the spring 49 is placed under tension and thus when the latch bar is lifted, the finger impelled by said spring, will displace the quadrant upwardly, leaving the lever free to return, so that the air supply valve 23 may close. For tripping the latch bar 58 two means are shown, but it is to be understood that various means for locking the lever as well as numerous means for tripping, may be employed and the invention is not to be limited to the means shown and described.

It is to be understood that while I have illustrated the invention in connection with an air pressure fluid supply and control for elevating the liquid to the receptacle 17, any means may be operated by the plunger to control the supply of liquid to the receptacle.

A measure indicating dial or wheel 59 is mounted to the right (Fig. 3) of the latch bar 58 and has a pin 60 (Figs. 4 and 5) on its rear side. This wheel has one end of a flexible connection 61 wound thereon. This connection 61 is suitably connected through the base 16 with a float 64 in the measuring receptacle. The wheel 59 has a grooved drum 66 concentrically mounted on its face and from the same side as the connection 61, a flexible connection 67 hangs from the drum. A counter weight 68 is attached to the connection 67 and acts to counter-balance the float 64 and by unwinding from the drum 66, when said float is elevated, revolves said wheel in a counter-clockwise direction, whereby the connection 61 is wound thereon.

When the float approaches the top of the cylinder the pin 60 approaches the end of the bar 58 and as the float finishes its upward movement the pin depresses the latch bar, which is thus lifted from the shoulder 57 and the quadrant 52 is thereby released. Thus when the cylinder is filled to the required level, the supply valve 23 is closed.

The receptacle 17 has a dispensing valve 71 suitably connected therewith by a pipe 72 passing through the base 16. A hose 73 is suitably connected with the dispensing valve. This valve may be of any approved type and has a hand lever 74. A link 75 is eccentrically connected to the hand lever so as to be moved inwardly when the valve is opened. The link extends through a slot in the cabinet and is connected with a crank arm 76 (Figs. 3 and 6) fastened on the upper end of a vertical rock shaft 77 supported in brackets 78 on the inside of the cabinet 15.

On its lower end the shaft has a laterally directed arm 79 having its outer end forked and pivotally connected with a transverse lock bar 80 (Figs. 4 and 5). The inner end of the bar 80 rests in an aperture 81 in the upper end of the casting 35 and passes through a lug 82 on a bracket yoke 83 fastened to the crossbar 45. The plunger 46 has a notch 46' (Fig. 2) which registers with the aperture 81 when the plunger is in its normal position. When the lever 74 is swung to open the dispensing valve 71 the link 75 is pushed inwardly, whereby the shaft 77 is rocked to slide the lock bar 80 into the notch 46' of the plunger 46, and consequently the plunger cannot be depressed when the dispensing valve 71 is opened. This prevents the operation of the liquid supply, while liquid is being dispensed.

A horizontal shaft 84 is mounted in the yoke 83 and has operating connection with a meter 85 mounted on the front of the yoke by a friction clutch disk 86. The wheel 59 is journaled on the shaft and is engaged and disengaged with the clutch. This clutch mechanism is more specifically disclosed in my application Serial No. 665,582 of which this case is a division.

When the lever 74 is swung to close the dispensing valve the shaft 77 is rocked to move the bar 80 out of the notch 46'. The plunger 46 is released by this movement of the bar 80 and when the wheel is revolved in filling the receptacle, the meter will not be operated or disturbed. It will be seen that should an attempt be made to swing the hand lever 74 to open the valve 71, while the plunger was depressed and the receptacle is being filled, the bar 80 would abut the plunger and stop further movement of the lever 74.

In some instances it is desirable to operate the dispenser with a hand pump and for this purpose a rotary pump 97 is coupled in the pipe 13 and has a pinion 98 on the outer end of its shaft. This pinion is driven by a gear 99 fastened on a transverse shaft 100 extending through the side of the cabinet 15. A crank handle 101 is detachably secured on the end of the shaft 100. When the hand pump is not used, the handle is removed and the liquid is forced through the pump by the air pressure.

On the shaft 100 is fastened another wheel 102 on the inside of the cabinet as is shown in Figs. 3, 10 and 11. A locking dog 103 is pivoted inside the cabinet over the wheel and has its swinging end pivoted inside the cabinet over the wheel and has its swinging end pivoted to the lower end of a link 104. The link has its upper end pivoted to the horizontal leg of a bell-crank lever 105 pivoted on a bracket 106. The lever 105 (Fig. 3) has its vertical leg in the path of the arm 79.

When the dispensing valve is opened and the arm 79 swung inwardly the dog 103 is permitted to fall into one of the teeth of the wheel 102, which is thus locked against rotation for operating the pump. When the dispensing valve is closed the arm 79 is swung outwardly and engages the lever 105 which is thus swung and this raises the dog and frees the wheel. When the cabinet is closed the door 22 is raised. A block 109 in one of the guide channels 22' of the door is slid upwardly by the door as it reaches its closed position and elevates a rod 108 connected with the block through a slot 110 in the said channel. The rod swings a pawl 107 into the teeth of the wheel 102 and the shaft 100 cannot be rotated to operate the pump until the door is lowered to open position.

In operating the dispenser the operator places his thumb on the button 47, and depresses the plunger 46 which swings the lever 42. The valve 23 resists the initial movement of the lever and consequently the lever fulcrums in the head 43 of the valve, which remains seated. This causes the boss 44 to engage the button 41 and seat the valve 34. After the valve 34 is seated the lever changes its fulcrum point to the boss 44 and the valve 23 is unseated by the continued movement of the plunger.

As the depression of the plunger is continued, the spring 49 is tensioned and the finger 51 rides under the lug 56 and comes to rest in rear of the bevelled edge of the same. At the same time the bar 58 drops behind the shoulder 57 as is shown in Fig. 2. With the parts in this position the air supply valve is held open. The operator may remove his thumb from the button 47. Compressed air is conveyed by the pipe 32 to the tank 11 from which it elevates the liquid through the pipes 13 to the measuring receptacle, whereby the cylinder 17 is filled to the top of the overflow pipe 19. As the cylinder is filled the float 64 rises and the wheel 59 is revolved in a counter-clockwise direction by the unwinding of the connection 67 from the drum 66.

When the liquid has reached the proper level the pin 60 on the wheel 59 will engage the bar 58 and swing the same to trip the quadrant. As the connection 67 is unwound from the drum, the connection 61 is wound on the wheel 59.

Just as soon as the latch bar 58 is raised the tension of the spring 49 causes the finger 51 to ride off the lug 56, which is displaced upward so that the bar 58 drops upon the arcuate edge of said quadrant. The spring 49 returns the lever 42 and the plunger 46 to their normal positions. During the first part of the return movement the boss 44 fulcrums on the button 41 and the valve 23 is first closed. After the valve 23 is seated the fulcrum point changes to the head 43 and the pressure on the button 41 is relieved, which permits the release valve 34 to open. This releases the trapped air which escapes through the pipes 36 and 37.

When it is desired to dispense the liquid from the receptacle the hand lever 74 is swung to open the dispensing valve 71, which permits the liquid to pass out through the hose 73. When the lever 74 is swung the link 75 rocks the shaft 77 which in turn swings the arm 79 inward, whereby the lock bar 80 is moved inwardly and its end engaged in the notch 46' of the plunger, thus locking the same against depression and preventing the operation of the liquid supply when the dispensing valve is opened. When the shaft 77 is rocked and the arm 79 swung inward, the bell crank lever 105 will be released, so that if the dispenser was being operated with the hand pump 97, the dog 103 would be dropped into the teeth of the wheel 102 and the operation of the pump prevented.

When the desired quantity of liquid has been dispensed the handle 74 is swung to close the valve 71 and this pulls the link 75, whereby the shaft 77 is rocked to move the bar 80 out of the notch 46'. This unclutches the meter and releases the plunger 46. This operation also causes the arm 79 to swing the lever 105 and raise the dog 103, which frees the wheel 102 and the hand pump 97.

Various changes in the size and shape of the different parts, as well as modifications and alterations may be made within the scope of the appended claims.

What I claim, is:

1. In a liquid dispenser, a measuring receptacle, means for supplying liquid to the receptacle, a liquid dispensing valve connected with the receptacle, a lock having an operating connection with said valve for preventing the operation of the liquid supply means when the dispensing valve is open, and a meter having a movable part disposed to control said lock.

2. In a liquid dispenser, a measuring receptacle, means for supplying a liquid to the receptacle, means for automatically cutting off the supply of liquid when the receptacle is full, a dispensing valve connected with the receptacle, and a lock having an operating connection with said valve controlled by the cut-off means for preventing the operation of the liquid supply means when the dispensing valve is open.

3. In a liquid dispensing apparatus, a measuring receptacle, fluid pressure actuated apparatus for filling said receptacle, valve mechanism in said pressure apparatus for controlling the pressure in said dispensing apparatus, means controlled by the liquid level in the receptacle to automatically render said fluid pressure actuated apparatus inoperative when the receptacle is full, a dispensing valve connected with the receptacle, mechanical locking connections extending from the operating means of the dispensing valve to the valve mechanism in the fluid pressure actuating apparatus, and means for releasing the valve mechanism on the fluid pressure actuating apparatus when the dispensing valve is closed.

4. In a liquid dispensing apparatus, a measuring receptacle, fluid pressure actuated apparatus for filling said receptacle, valve mechanism in said pressure apparatus for controlling the pressure in said dispensing apparatus, a manually actuated connection for said valve mechanism, a liquid dispensing valve connected to the receptacle independently of said valve mechanism, and operating means from the dispensing valve carrying a member disposed to interlock with the manually actuated connection when the dispensing valve is opened and to prevent movement of the operating means for dispensing valve when the pressure controlling valve is opened.

5. In a liquid dispensing apparatus, a measuring receptacle, fluid pressure actuated apparatus for filling said receptacle, valve mechanism in said pressure apparatus for controlling the pressure in said dispensing apparatus, a manually actuated plunger for operating said valve mechanism, and a locking element projected into the path of said plunger by a mechanical connection from the dispensing valve.

6. In a liquid dispensing apparatus, a measuring receptacle, fluid pressure actuated apparatus for filling the receptacle, valve mechanism in said pressure apparatus for controlling the pressure in said dispensing apparatus, a reciprocating operating element connected to said valve mechanism, a longitudinally movable locking member disposed to transversely engage said operating element, and an operating connection with the dispensing valve for actuating the locking member.

7. In a liquid dispensing apparatus, a measuring receptacle, fluid pressure actuated apparatus for filling the receptacle, valve mechanism in said pressure apparatus for controlling the pressure in said dispensing apparatus, a plunger for operating said valve mechanism, a transverse locking bar disposed to engage the plunger or pass through a recess therein, means for reciprocating said bar, a dispensing valve connected with said receptacle, and an operating connection between the dispensing valve and said means for reciprocating the bar.

8. In a liquid dispensing apparatus, a measuring receptacle, fluid pressure actuated apparatus for filling the receptacle, valve mechanism in said pressure apparatus for controlling the pressure in said dispensing apparatus, a plunger for operating said valve mechanism, a transverse locking bar for engaging the plunger, an upright shaft, an arm on the lower end of the shaft connected with the locking bar, a crank arm on the upper end of the shaft, a dispensing valve connected with the receptacle, and a connection between the dispensing valve and the crank arm for swinging the latter.

9. In a liquid dispensing apparatus, a measuring receptacle, fluid pressure actuated apparatus for filling the receptacle, valve mechanism in said pressure apparatus for controlling the pressure in said dispensing apparatus, a lever for operating said valve mechanism, a plunger for operating said lever and having a notch, a reciprocating locking bar engaging the notch of the plunger to lock the same against operation, an upright shaft, an arm on the lower end of the shaft connected with the locking bar, a crank arm on the upper end of the shaft, a dispensing valve connected with the receptacle, and a link connection between the crank arm and the dispensing valve.

10. In a liquid dispensing apparatus, a measuring receptacle, fluid pressure actuated apparatus for filling the receptacle, valve mechanism in said pressure apparatus for controlling the pressure in said dispensing apparatus, means for fastening said valve mechanism in open position, float operated means for tripping said fastening means, means for automatically closing the valve mechanism when tripped, a dispensing valve, means for locking the valve mechanism against operation, and means operated by the dispensing valve control for operating the locking means.

11. In a device of the character described, the combination of a measuring receptacle, a float movable vertically in the receptacle, an indicator wheel having symbols on its face, a pointer with which the symbols register when the wheel is revolved, a flexible connection extending from the float and wound on the wheel, a drum attached to the wheel, a weighted flexible connection wound on the drum in a direction opposite to the winding of the first named flexible connection, a fluid pressure actuated apparatus for filling the receptacle, and a fluid pressure controlling valve lock having a trip operating by the revolving wheel.

12. In a device of the character described, the combination of a measuring receptacle, a float movable vertically in the receptacle, an indicator wheel having symbols on its face, a pointer with which the symbols register when the wheel revolves, a flexible connection extending from the float and wound on the wheel, a drum attached to the wheel, a weighted flexible connection wound on the drum in a direction opposite to the winding of the first named flexible connection, a fluid pressure actuated apparatus for filling the receptacle, a fluid pressure controlling valve lock having a trip operated by the revolving wheel, and means for tripping the lock independently of the wheel.

13. In a level indicating and controlling means, the combination of a measuring receptacle, a float movable in the receptacle, an indicating wheel, a flexible connection extending from the float and wound on the wheel, a fluid pressure actuated apparatus for filling the receptacle, a fluid pressure controlling valve having an operating element, a latch element fastening the valve operating element in open position, and means on the measuring wheel for tripping the latch element when the receptacle is filled.

14. In a level indicating and controlling means, the combination of a measuring receptacle, a float movable in the receptacle, an indicating wheel, a flexible connection extending from the float and wound on the wheel, a fluid pressure actuated apparatus for filling the receptacle, a fluid pressure controlling valve having an operating element, a latch element fastening the valve operating element in open position, and means independent of the wheel for tripping the latch element when the receptacle is partially filled.

15. In a level indicating and controlling means, the combination of a measuring receptacle, a float movable in the receptacle, an indicating wheel, a flexible connection extending from the float and wound on the wheel, a fluid pressure actuated apparatus for filling the receptacle, a fluid pressure controlling valve having an operating element, a pivoted latch operating element fastening the valve operating element in open position, and a pin on the wheel engaging the latch for tripping the same.

16. In a fluid dispenser, the combination of a measuring receptacle, a fluid pressure actuated apparatus for filling the receptacle, a fluid pressure controlling valve therefor, a float in the receptacle, a movable measure indicator connection for operation by said float, a liquid dispensing valve connected with the receptacle independent of the pressure controlling valve, and locking means operatively connected between the controlling and dispensing valves to lock one of said valves when the other is opened.

17. In a fluid dispenser, the combination of a measuring receptacle, a fluid pressure actuated apparatus for filling the receptacle, a fluid pressure controlling valve therefor, a manually actuated connection for controlling the same, a liquid dispensing valve connected to the receptacle independently of the pressure controlling valve, and locking means reciprocated by the actuating means for the dispensing valve and disposed to interlock with and retain said operating connection for the pressure controlling valve.

18. In a fluid dispenser, the combination of a measuring receptacle, a fluid pressure actuated apparatus for filling the receptacle, a fluid pressure controlling valve therefor, a manually actuated connection for controlling said means, a liquid dispensing valve connected to the receptacle independently of the pressure controlling valve, and operating means from the dispensing valve carrying a sliding locking device disposed to interlock with the manually actuated connection when the dispensing valve is opened and to prevent movement of the operating means for such valve when the pressure controlling valve is opened, whereby the valves are alternately locked.

In testimony whereof I affix my signature.

JOHN J. CATRON.